(12) United States Patent
Jung

(10) Patent No.: US 10,624,517 B2
(45) Date of Patent: Apr. 21, 2020

(54) ROBOT CLEANER AND METHOD FOR CONTROLLING THE SAME

(71) Applicant: EVERYBOT INC., Seongnam-si, Gyeonggi-do (KR)

(72) Inventor: Woo Chul Jung, Hwaseong-si (KR)

(73) Assignee: EVERYBOT INC., Seongnam-si (KR)

( * ) Notice: Subject to any disclaimer, the term of this patent is extended or adjusted under 35 U.S.C. 154(b) by 0 days.

(21) Appl. No.: 15/549,635

(22) PCT Filed: Feb. 5, 2016

(86) PCT No.: PCT/KR2016/001350
§ 371 (c)(1),
(2) Date: Aug. 8, 2017

(87) PCT Pub. No.: WO2016/129912
PCT Pub. Date: Aug. 18, 2016

(65) Prior Publication Data
US 2018/0028033 A1    Feb. 1, 2018

(30) Foreign Application Priority Data
Feb. 10, 2015   (KR) .................. 10-2015-0020508

(51) Int. Cl.
| A47L 11/40 | (2006.01) |
| A47L 11/16 | (2006.01) |
| A47L 11/283 | (2006.01) |
| A47L 9/28 | (2006.01) |
| A47L 11/282 | (2006.01) |
| G05D 1/00 | (2006.01) |
| G05D 1/02 | (2020.01) |

(52) U.S. Cl.
CPC .............. *A47L 11/4011* (2013.01); *A47L 9/28* (2013.01); *A47L 11/16* (2013.01); *A47L 11/282* (2013.01);
(Continued)

(58) Field of Classification Search
CPC .. A47L 11/4011; A47L 11/282; A47L 11/283; A47L 11/16; A47L 11/4005;
(Continued)

(56) References Cited

U.S. PATENT DOCUMENTS

| 5,646,494 A * | 7/1997 | Han ..................... A47L 11/4011 |
| | | 318/587 |
| 2005/0021181 A1* | 1/2005 | Kim ........................ A47L 9/009 |
| | | 700/245 |

(Continued)

FOREIGN PATENT DOCUMENTS

| JP | 2003-507108 A | 2/2003 |
| KR | 10-2006-0027721 A | 3/2006 |

(Continued)

*Primary Examiner* — Behrang Badii
*Assistant Examiner* — Daniel L Greene
(74) *Attorney, Agent, or Firm* — Novick, Kim & Lee, PLLC; Sang Ho Lee

(57) ABSTRACT

Provided herein is a robot cleaner. The robot cleaner includes a main body, a driving unit provided in the main body and supplying power for traveling of the robot cleaner, first and second rotary members respectively rotating about first and second rotational axes based on power from the driving unit and allowing cleaners for wet cleaning to be fixed thereto, a sensing unit sensing whether a traveling position of the robot cleaner is below an obstacle, and a controller controlling, when it is determined that the traveling position of the robot cleaner is below the obstacle on the basis of a sensing signal from the sensing unit, the driving unit such that the robot cleaner avoids a lower side of the obstacle.

14 Claims, 11 Drawing Sheets

(52) U.S. Cl.
CPC ......... *A47L 11/283* (2013.01); *A47L 11/4005* (2013.01); *A47L 11/4038* (2013.01); *A47L 11/4061* (2013.01); *A47L 11/4066* (2013.01); *A47L 11/4069* (2013.01); *G05D 1/0011* (2013.01); *G05D 1/0227* (2013.01); *G05D 1/0238* (2013.01); *G05D 1/0285* (2013.01); *A47L 2201/04* (2013.01); *A47L 2201/06* (2013.01); *G05D 2201/0203* (2013.01)

(58) Field of Classification Search
CPC .............. A47L 11/4038; A47L 11/4061; A47L 11/4066; A47L 11/4069; G05D 1/0011; G05D 1/0227; G05D 1/0238; G05D 1/0285

See application file for complete search history.

(56) References Cited

U.S. PATENT DOCUMENTS

| | | | | |
|---|---|---|---|---|
| 2005/0055792 | A1* | 3/2005 | Kisela | A47L 5/36 15/319 |
| 2006/0053580 | A1* | 3/2006 | Woo | A47L 9/009 15/319 |
| 2011/0202175 | A1* | 8/2011 | Romanov | A47L 11/4011 700/250 |
| 2013/0030750 | A1* | 1/2013 | Kim | G06N 3/004 702/108 |
| 2013/0060379 | A1* | 3/2013 | Choe | G06N 3/008 700/245 |
| 2015/0313438 | A1* | 11/2015 | Ebrahimi Afrouzi | A47L 11/4061 701/23 |
| 2016/0274579 | A1* | 9/2016 | So | A47L 9/2852 |
| 2016/0320777 | A1* | 11/2016 | Yun | G05D 1/0238 |

FOREIGN PATENT DOCUMENTS

| | | |
|---|---|---|
| KR | 10-2006-0095657 A | 9/2006 |
| KR | 10-2006-0105830 A | 10/2006 |
| KR | 20110105305 A | 9/2011 |
| KR | 10-2013-0002218 A | 1/2013 |
| KR | 10-1306501 B1 | 9/2013 |
| KR | 10-2014-0093369 A | 7/2014 |

* cited by examiner

| | DIRECTION | RATE | TIME |
|---|---|---|---|
| FIRST ROTARY MEMBER | 1 | 60 | n SECOND |
| SECOND ROTARY MEMBER | 2 | 60 | n SECOND |

ROBOT CLEANER AND METHOD FOR CONTROLLING THE SAME

TECHNICAL FIELD

The present invention relates to a robot cleaner and a method for controlling the same and, more particularly, to a robot cleaner for performing wet cleaning, while autonomously traveling, and a method for controlling the same.

BACKGROUND ART

With the development of industrial technologies, various devices have been automated. As well known, a robot cleaner is utilized as an appliance that automatically cleans an area desired to be cleaned by sucking foreign objects such as dust, or the like, or scrubbing foreign matter (or impurities) from a surface to be cleaned (or a target cleaning surface), while traveling in the area, without a user operation.

In general, a robot cleaner may include a vacuum cleaner performing cleaning with a suction force using a power source such as electricity, or the like.

A robot cleaner including such a vacuum cleaner, however, has limitations in that it cannot remove impurities or stains set in a target cleaning surface, and thus, recently, a robot cleaner having a floorcloth attached thereto to perform wet cleaning has emerged.

However, a wet cleaning scheme using a general robot cleaner is a simple scheme of attaching a floorcloth to a lower portion of the existing robot cleaner for vacuum cleaning, having a low effect of removing foreign object and not performing effective wet cleaning.

In particular, the robot cleaner based on the general wet cleaning scheme travels using a movement scheme of an existing suction type vacuum cleaner and an avoidance method regarding an obstacle as is, and thus, it cannot easily remove a foreign object set in the target cleaning surface, although it removes dust from the target cleaning surface.

Also, the general robot cleaner having the floorcloth-attached structure is moved by wheels in a state in which frictional force with the floor is high due to the plane of the floorcloth, additional driving force to move the wheels is required, increasing battery consumption.

DISCLOSURE

Technical Problem

An object of the present invention is to provide a robot cleaner in which a rotational force of a pair of rotary members is used as a movement power source of the robot cleaner and a cleaner for wet cleaning is fixed to a rotary member, thus performing wet cleaning, while traveling, and a method for controlling the same.

Another object of the present invention is to provide a robot cleaner which avoids entry into below an obstacle positioned to float at a predetermined height such as a sofa, a bed, and the like, and a method for controlling the same.

Technical Solution

According to an exemplary embodiment of the present invention, a robot cleaner may include: a main body; a driving unit provided in the main body and supplying power for traveling of the robot cleaner; first and second rotary members respectively rotating about first and second rotational axes based on power from the driving unit and allowing cleaners for wet cleaning to be fixed thereto; a sensing unit sensing whether a traveling position of the robot cleaner is below an obstacle; and a controller controlling, when it is determined that the traveling position of the robot cleaner is below the obstacle on the basis of a sensing signal from the sensing unit, the driving unit such that the robot cleaner avoids a lower side of the obstacle (i.e., a position or an area below the obstacle).

The sensing unit may include at least one of an illumination sensor sensing whether the traveling position is below an obstacle through ambient brightness and a distance sensor sensing whether the traveling position is below an obstacle by sensing a distance to a lower surface of the obstacle.

The driving unit may include a first driving unit corresponding to the first rotational axis and a second driving unit corresponding to the second rotational axis, and when it is determined that the traveling position of the robot cleaner is below an obstacle, the controller may control at least one of a rotation direction and a rotation speed of at least one of the first and second driving units such that the robot cleaner avoids the lower side of the obstacle.

The controller may control at least one of a rotation direction and a rotation speed of at least one of the first and second driving units such that the robot cleaner travels along a boundary region between a region below the obstacle and a region not below the obstacle.

The controller may control at least one of a rotation direction and a rotation speed of at least one of the first and second driving units such that a front side and a rear side of the robot cleaner are sequentially disposed to be parallel to the boundary region according to rotational traveling of the robot cleaner and the robot cleaner travels along the boundary region.

The controller may control at least one of a rotation direction and a rotation speed of at least one of the first and second driving units such that the flank of the robot cleaner is disposed to be parallel to the boundary region and the robot cleaner performs straight traveling along the boundary region.

The controller may control at least one of a rotation direction and a rotation speed of at least one of the first and second driving units such that the robot cleaner travels in a direction opposite to the lower side of the obstacle.

The controller may control the robot cleaner to travel along the boundary region in a state in which a portion of the robot cleaner is positioned below the obstacle and another portion thereof is not positioned below the obstacle.

According to another exemplary embodiment of the present invention, a method for controlling a robot cleaner may include: rotating at least one of first and second rotary members respectively rotating about first and second rotational axes thereof to control the robot cleaner to travel in a specific traveling direction; sensing whether a traveling position of the robot cleaner is below an obstacle, while the robot cleaner is traveling; and when it is determined that the traveling position of the robot cleaner is below an obstacle, controlling a driving unit supplying power for traveling of the robot cleaner such that the robot cleaner avoids a lower side of the obstacle.

The driving unit may include a first driving unit corresponding to the first rotational axis and a second driving unit corresponding to the second rotational axis, and, in the controlling of the robot cleaner to avoid the lower side of the obstacle, when it is determined that the traveling position of the robot cleaner is below an obstacle, at least one of a rotation direction and a rotation speed of at least one of the first and second driving units may be controlled such that the robot cleaner avoids the lower side of the obstacle.

In the controlling of the robot cleaner to avoid the lower side of the obstacle, at least one of a rotation direction and a rotation speed of at least one of the first and second driving units may be controlled such that the robot cleaner travels along a boundary region between a region below the obstacle and a region not below the obstacle.

In the controlling of the robot cleaner to travel along the boundary region, the robot cleaner may be controlled to travel along the boundary region in a state in which a portion of the robot cleaner is positioned below the obstacle and another portion thereof is not positioned below the obstacle.

Advantageous Effects

According to the various exemplary embodiments of the present invention described above, the robot cleaner may travel, while performing wet cleaning, using rotational force of the pair of rotary member as a movement power source.

Also, according to the various exemplary embodiments of the present invention described above, since the robot cleaner uses rotational force of the pair of rotary members as a movement power source, battery efficiency may be improved.

In addition, according to the various exemplary embodiments of the present invention described above, the robot cleaner may effectively remove impurities set in a target cleaning surface through frictional contact between a first cleaner and a second cleaner respectively rotating according to rotational motions of a first rotary member and a second rotary member and a target cleaning surface.

In addition, according to the various exemplary embodiments of the present invention described above, since the robot cleaner is prevented from entering a region below an obstacle positioned to float at a predetermined height such as a sofa, a bed, and the like, a problem in which the robot cleaner is lost as a battery thereof is discharged below the obstacle, a problem in which the robot cleaner is caught by an electric line below the obstacle, or the like, so it cannot travel, and the like, may be solved.

BEST MODE

Figure 1:
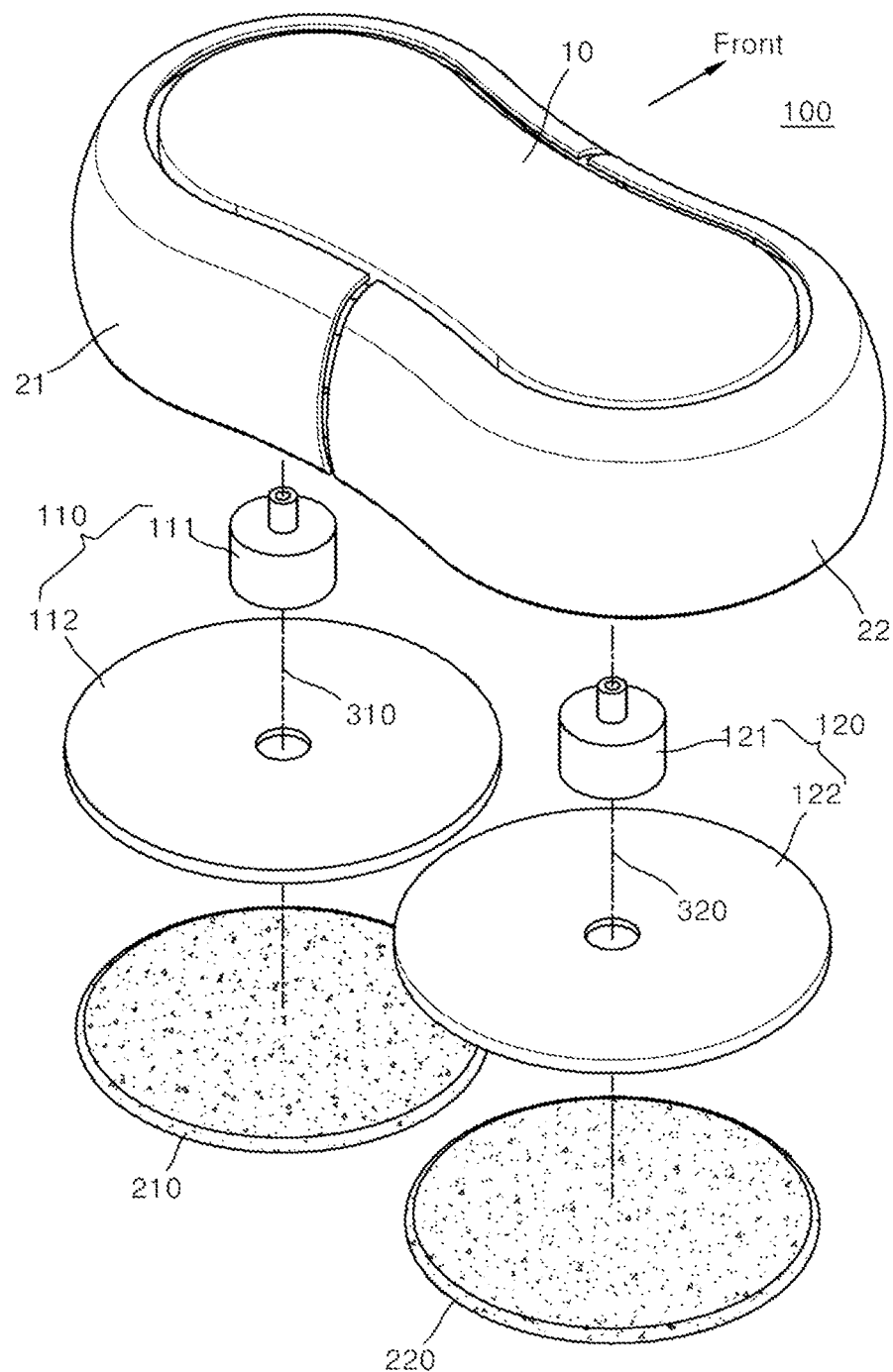
FIG. 1 is an exploded perspective view of a robot cleaner according to various exemplary embodiments of the present invention.

The following content merely illustrates the principles of the invention. Therefore, although it is not clearly described or illustrated herein, those skilled in the art may implement the principles of the present invention that includes a wide variety of devices that can be invented. In addition, all conditional terms listed herein and understood that the embodiments are intended only for the purpose of, in principle, to understand the concept of the present invention is clearly not limited to the embodiment and state specifically enumerated.

In addition, it should be understood that all the detailed descriptions for specific embodiments, as well as the principle, perspectives, and embodiments, intentionally include structural and functional equivalents of such matters. Also, it should be understood that the equivalents include all the devices invented to perform the same functions irrespective of the equivalents, i.e., structures, to be developed in the future, as well as currently known equivalents.

Thus, for example, a block diagram of the present disclosure is to be understood to represent a conceptual point of view of an exemplary circuit that embodies the principles of the present invention. Similarly, flow diagrams, state transition, such as a pseudo-code, or the like, may be understood to be substantially represented in a computer-readable medium and represent various processes performed by a computer or a processor, no matter whether the computer or the processor is clearly illustrated.

The processor or a similar concept that includes the functional blocks shown in the drawings and various features of the device with the ability to run the software in conjunction with the appropriate software may be provided by the use of hardware, as well as dedicated hardware. Features, a single dedicated processor, by the processor when they become available, can be provided by a single shared processor, or a plurality of individual processors, some of which can be shared In addition, the use of control processor, or similar terms that are presented as a concept is not to be construed as exclusive of hardware, with the ability to run the software, and it should be understood as implicitly including a read-only memory (ROM), a random access memory (RAM), and a nonvolatile memory for storing the digital signal processor (DSP), hardware, and software, without limitation. Also, other well-known hardware may be included Components are expressed as the means to perform the functions described in the detailed description of the claims herein, including all types of software, for example, which includes a combination of circuit elements that perform the functions or the firmware/microcode intended to include, and how to perform the function of, for performing the functions mentioned above are combined with appropriate circuitry for executing software. The present invention is defined by the scope of these claims, because a combination of the features offered by various means listed and combined with the claim needs to be understood by any means that can provide the functions herein.

The aforementioned objects, features and advantages will become more apparent through the following detailed description with respect to the accompanying drawings, the technical idea of the present invention with a person of ordinary skill in the art the present invention, accordingly, can be easily carried out. In describing the present invention, a detailed description of known techniques associated with the present invention unnecessarily obscure the gist of the present invention, it is determined that the detailed description thereof will be omitted.

Hereinafter, various exemplary embodiments of the present invention will be described in detail with reference to the accompanying drawings.

Figure 2:
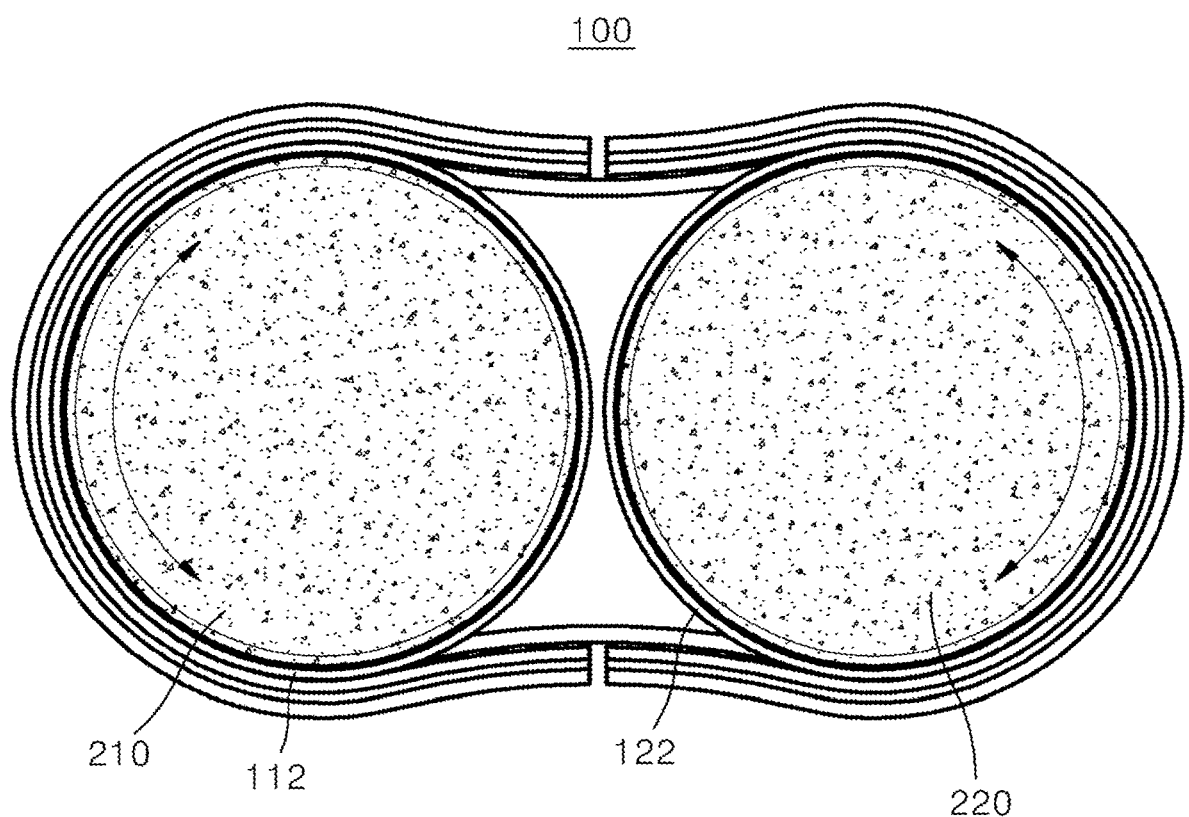
FIG. 2 is a bottom view of a robot cleaner according to various exemplary embodiments of the present invention.
Figure 3:
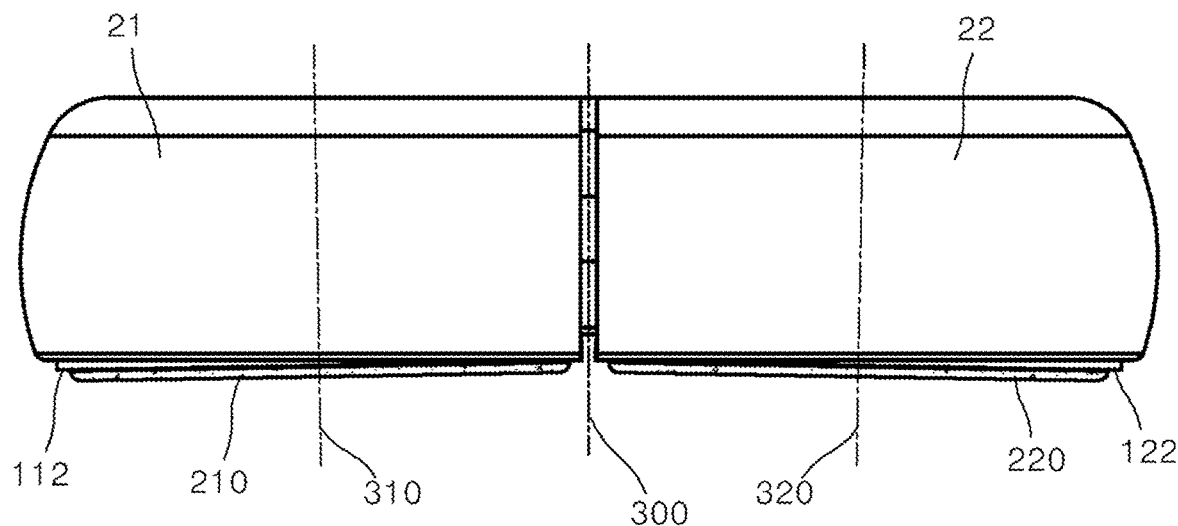
FIG. 3 is a front view of a robot cleaner according to various exemplary embodiments of the present invention.
Figure 4:
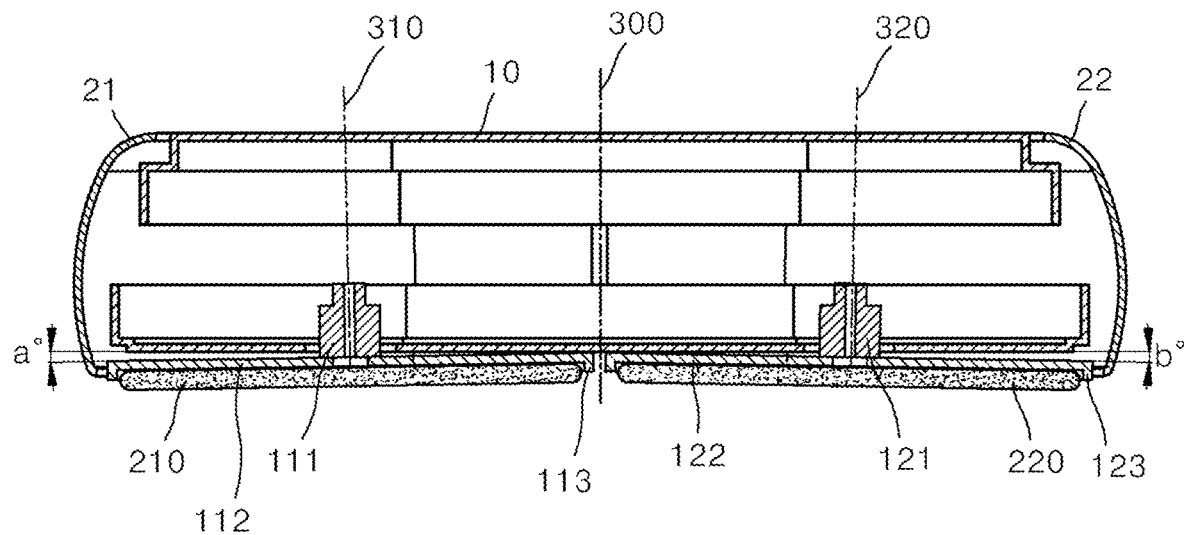
FIG. 4 is a cross-sectional view of a robot cleaner according to various exemplary embodiments of the present invention.

FIGS. 1 to 4 are views illustrating a structure of a robot cleaner according to an exemplary embodiment of the present invention. Specifically, FIG. 1 is an exploded perspective view of a robot cleaner according to various exemplary embodiments of the present invention, FIG. 2 is a bottom view of a robot cleaner according to various exemplary embodiments of the present invention, FIG. 3 is a front view of a robot cleaner according to various exemplary embodiments of the present invention, and FIG. 4 is a cross-sectional view of a robot cleaner corresponding to the front view of FIG. 3.

Referring to FIGS. 1 to 4, a robot cleaner 100 according to an exemplary embodiment of the present invention may include a main body 10 structurally forming an appearance of the robot cleaner 100, a bumper 20 formed on an outer circumference of the main body 10 to protect the main body 10 from an external impact, a sensing unit 130 sensing an external impact applied to the bumper 20, a driving unit 150 installed in the main body 10 to provide power enabling the robot to travel, first and second rotary members 110 and 120 coupled to the driving unit 150 to rotate, and a power supply unit 190 installed within the main body 10.

The robot cleaner 100 may travel, while performing wet cleaning using cleaners 210 and 220 for wet cleaning. Here, wet cleaning may refer to scrubbing a surface to be cleaned (or a target cleaning surface) using the cleaners 210 and 220. For example, wet cleaning may include both cleaning using a dry floorcloth and cleaning using a floorcloth wet with a liquid.

The driving unit 150 may include a first driving unit 151 installed within the main body 10 and coupled to the first rotary member 110 and a second driving unit 152 installed within the main body 10 and coupled to the second rotary member 120. Here, the driving unit 150 may be implemented by including a motor, a gear assembly, and the like.

The first rotary member 110 may include a first transmission member 111 coupled to the first driving unit 151 to transmit power based on the first driving unit 151, and rotating about a first rotational axis 310 based on the power. Also, the first rotary member 110 may include a first fixing member 112 to which the first cleaner 210 for wet cleaning may be fixed.

The second rotary member 120 may include a second transmission member 121 coupled to the second driving unit 152 to transmit power based on the second driving unit 152 and rotating about a second rotational axis 320 based on the power. Also, the second rotary member 120 may include a second fixing member 122 to which the second cleaner 220 for wet cleaning may be fixed.

Here, when the first transmission member 111 and the second transmission member 121 are coupled to the main body 10, lower end regions of the first transmission member 111 and the second transmission member 121 may be protrude in a direction toward a target cleaning surface. Or, when the first transmission member 111 and the second transmission member 121 are coupled to the main body 10, the first transmission member 111 and the second transmission member 121 may not protruded in the direction toward the target cleaning surface.

Also, when the first fixing member 112 and the second fixing member 122 are coupled to the main body 10, the first fixing member 112 and the second fixing member 122 may protrude in a direction toward the target cleaning surface, e.g., a floor, and the first cleaner 210 and the second cleaner 220 may be fixed thereto, respectively.

The first cleaner 210 and the second cleaner 220 may be formed of a fiber material such as a floorcloth used to scrub various target cleaning surfaces, such as a microfibrous cloth, a cloth, felt, a brush, and the like, to remove foreign matter set in a floor through a rotational motion. Also, the first cleaner 210 and the second cleaner 220 may have a circular shape as illustrated in FIG. 1, but without being limited thereto, the first cleaner 210 and the second cleaner 220 may be implemented to have various shapes.

The first and second cleaners 210 and 220 may be put on the first and second fixing members 112 and 122 so as to be fixed to the first and second fixing members 112 and 122, or may be fixed to the first and second fixing members 112 and 122 using a separate adhering unit. For example, the first and second cleaners 210 and 220 may be adhered and fixed to the first and second fixing members 112 and 122 by the Velcro tap, or the like, respectively.

The robot cleaner 100 according to an exemplary embodiment of the present invention may remove foreign matter set in the floor through frictional contact with the target cleaning surface as the first and second cleaners 210 and 220 rotate according to rotational motions of the first and second rotary members 110 and 120. Also, when frictional force is generated with respect to the target cleaning surface, the frictional force may be used as a movement power source of the robot cleaner 100.

In detail, in the robot cleaner 100 according to an exemplary embodiment of the present invention, frictional force with respect to the target cleaning surface is generated according to rotation of the first and second rotary members 110 and 120, and a movement speed and a direction of the robot cleaner 100 may be adjusted according to a magnitude of a resultant force and a direction in which the resultant force acts.

In particular, referring to FIGS. 3 and 4, the first and second rotational axes 310 and 320 of the first and second rotary members 110 and 120 based on power of the pair of driving units 151 and 152 may be tilted at a predetermined angle with respect to a central axis 300 corresponding to an axis in a vertical direction of the robot cleaner 100. Here, the first and second rotary members 110 and 120 may be tilted to the outside downwards with respect to the central axis 300. That is, among regions of the first and second rotary members 110 and 120, a region away from the central axis 300 may be more strongly adhered to the target cleaning surface than a region closer to the central axis 300.

Here, the central axis 300 may refer to a longitudinal axis with respect to the target cleaning surface of the robot cleaner 100. For example, when it is assumed that the robot cleaner 100 travels on an X-Y plane formed by X and Y axes to perform cleaning during a cleaning operation, the central axis 300 may refer to a Z axis of the robot cleaner 100, perpendicular to the target cleaning surface.

Meanwhile, the predetermined angle may include a first angle (angle a) corresponding to an angle at which the first rotational axis 310 is tilted with respect to the central axis 300 and a second angle (angle b) corresponding to an angle at which the second rotational axis 320 is tilted with respect to the central axis 300. Here, the first angle and the second angle may be the same or different.

The first and second angles may each preferably be within a range from 1° to 3°. Here, the aforementioned angle range may be a range in which wet cleaning capability, traveling speed, and traveling performance of the robot cleaner 100 is optimally maintained as can be seen in Table 1 below.

TABLE 1

| Tilted angle | Cleaning capability (based on 3 points) | Traveling speed (based on 3 points) |
| --- | --- | --- |
| Less than 1° | Entire target cleaning surfaces in frictional contact with cleaner can be cleaned (3) | Very slow (0) |
| 1° | Entire target cleaning surfaces in frictional contact with cleaner can be cleaned (3) | Slow (1) |
| 1.85° | Target cleaning surfaces in frictional contact with cleaner, excluding a portion near central axis, can be cleaned (2) | Normal (2) |
| 3° | Target cleaning surfaces in frictional contact with cleaner, excluding a portion near central axis, can be cleaned (1) | Fast ( ) |
| Greater than 3° | Target cleaning surfaces in frictional contact with cleaner, excluding most regions near central axis, can be cleaned (0) | Fast (3) |

Referring to Table 1 above, since the robot cleaner 100 has a structure in which the pair of rotational axes 310 and 320 are tilted at a predetermined angle with respect to the central axis 300, a traveling speed and cleaning capability of the robot cleaner 100 may be adjusted. In particular, wet cleaning capability and a traveling speed of the robot cleaner 100 may be optimally maintained by maintaining the predetermined angle at a range from 1° to 3°. However, various exemplary embodiments of the present invention may not be limited thereto.

Meanwhile, when the pair of rotary members 110 and 120 rotate according to the predetermined angle, a relative frictional force generated between the pair of rotary members 110 and 120 and the target cleaning surface may be greater in an outer portion of the main body 10 than in a central portion thereof. Thus, a movement speed and direction of the robot cleaner 100 may be controlled by the relative frictional force generated by controlling each of the pair of rotary members 110 and 120. Controlling the movement speed and direction of the robot cleaner 100 according to an exemplary embodiment of the present invention will be described hereinafter.

Meanwhile, when the robot cleaner 100 travels according to the aforementioned operations, the robot cleaner 100 may collide with various obstacles present on the target cleaning surface. Here, the obstacles may include various obstacles hindering traveling of the robot cleaner 100 for performing cleaning, such as a low obstacle like a threshold, carpet, and the like, an obstacle positioned to float at a predetermined height like a sofa, a bed, and the like, and a high obstacle like a wall, or the like.

Here, the bumper 20 formed on an outer circumference of the main body 10 of the robot cleaner 100 may protect the main body 10 from an external impact due to collision with an obstacle and absorb the external impact. Also, the sensing unit 130 installed within the main body 10 may sense the impact applied to the bumper 10.

The bumper 20 may include a first bumper 21 formed on a first outer circumference of the main body 10 and a second bumper 22 formed on a second outer circumference of the main body 10, separate from the first bumper 21. Here, the bumper 20 may be formed on left and right circumferences of the main body 10 with respect to a direction F in which a front side of the robot cleaner 10 faces. For example, referring to FIGS. 1 to 4, the first bumper 21 may be formed on the left circumference of the main body 10 with respect to the direction F in which the front side of the robot cleaner 10 faces, and the second bumper 22 may be formed on the right circumference of the main body 10 with respect to the direction F in which the front side of the robot cleaner 100 faces.

Here, the first bumper 21 and the second bumper 22 may be implemented as physically separate different bumpers. Thus, the bumpers 21 and 22 of the robot cleaner 100 may separately operate. That is, in cases where the first bumper 21 collides with an obstacle while the robot cleaner 100 is traveling, the first bumper 21 absorbs an external impact and transmits the absorbed external impact to a first sensing unit installed to correspond to the first bumper 21. However, since the second bumper 22 is implemented as a bumper physically separate from the first bumper 21, the second bumper 22 is not affected by the collision and a second sensing unit installed to correspond to the second bumper 22 may not receive the external impact.

Meanwhile, according to an exemplary embodiment of the present disclosure, upper and lower ends of the bumper 20 are formed at a height to correspond to predetermined conditions, whereby the robot cleaner 100 may sense various obstacles that the robot cleaner 100 encounters during traveling. This will be described in detail with reference to FIG. 4.

Referring to FIG. 4, lower ends of the first bumper 21 and the second bumper 22 may be formed to be as close as possible to the target cleaning surface. In detail, a distance between the lower ends of the first bumper 21 and the second bumper 22 and the target cleaning surface may be equal to or smaller than a thickness of the cleaners 210 and 220. Thus, the first and second bumpers 21 and 22 may collide with a low obstacle such as a thin threshold, carpet, and the like, to sense and avoid the low obstacle.

Also, upper ends of the first and second bumpers 21 and 22 may be formed to prevent occurrence of a phenomenon in which only an obstacle is caught by only the main body 10, without colliding with the bumpers 21 and 22. In detail, heights of the upper ends of the first and second bumpers 21 and 22 may be equal to or higher than a height of the main body 10. Thus, the first and second bumpers 21 and 22 may collide with an obstacle positioned to float at a predetermined height, such as a sofa, a bed, and the like, preventing occurrence of a phenomenon in which the obstacle is caught by only the main body 10, without colliding with the first and second bumpers 21 and 22.

Meanwhile, according to an exemplary embodiment of the present invention, the robot cleaner 100 may have guide parts 113 and 123 guiding the cleaners 210 and 220 to be fixed to optimal positions, respectively.

If the cleaners 210 and 220 are not fixed to optimal positions, the first and second cleaners 210 and 220 may come into contact with different target cleaning surfaces according to rotation of the first and second rotary members 112 and 122, forming an unbalanced state therebetween. Here, the robot cleaner 100 may not perform desired traveling. For example, the robot cleaner 100 in a straight traveling mode may travel to form a curved line, rather than performing straight traveling.

Thus, according to an exemplary embodiment of the present invention, lower surfaces of the first and second rotary members 112 and 122 to which the cleaners 210 and 220 are respectively fixed may have the guide parts 113 and 123 protruding toward the target cleaning surface from edges of the lower surfaces to allow the cleaners 210 and 220 to be fixed in optimal positions. Accordingly, a user of the robot cleaner 100 may fix the cleaners 210 and 220 to optimal positions.

Meanwhile, the sensing unit 130 may sense an external impact applied to the bumper 10. Here, the sensing unit 130 may include a plurality of sensing units installed in positions respectively corresponding to the plurality of bumpers. For example, when two bumpers 21 and 22 are implemented, the sensing unit 130 may include at least one first sensing unit installed to correspond to the first bumper 21 and at least one second sensing unit installed to correspond to the second bumper 22, and may be implemented as a contact sensor, an optical sensor, and the like. The sensing unit 130 may transmit a sensing result to a controller 170.

Also, the controller 170 may determine a collision position of a portion of the bumper 20 which has collided with the obstacle using the sensing result from the sensing unit 130, and control the first and second driving units 151 and 152 to avoid the obstacle on the basis of the determined collision position.

Figures 5, 6:
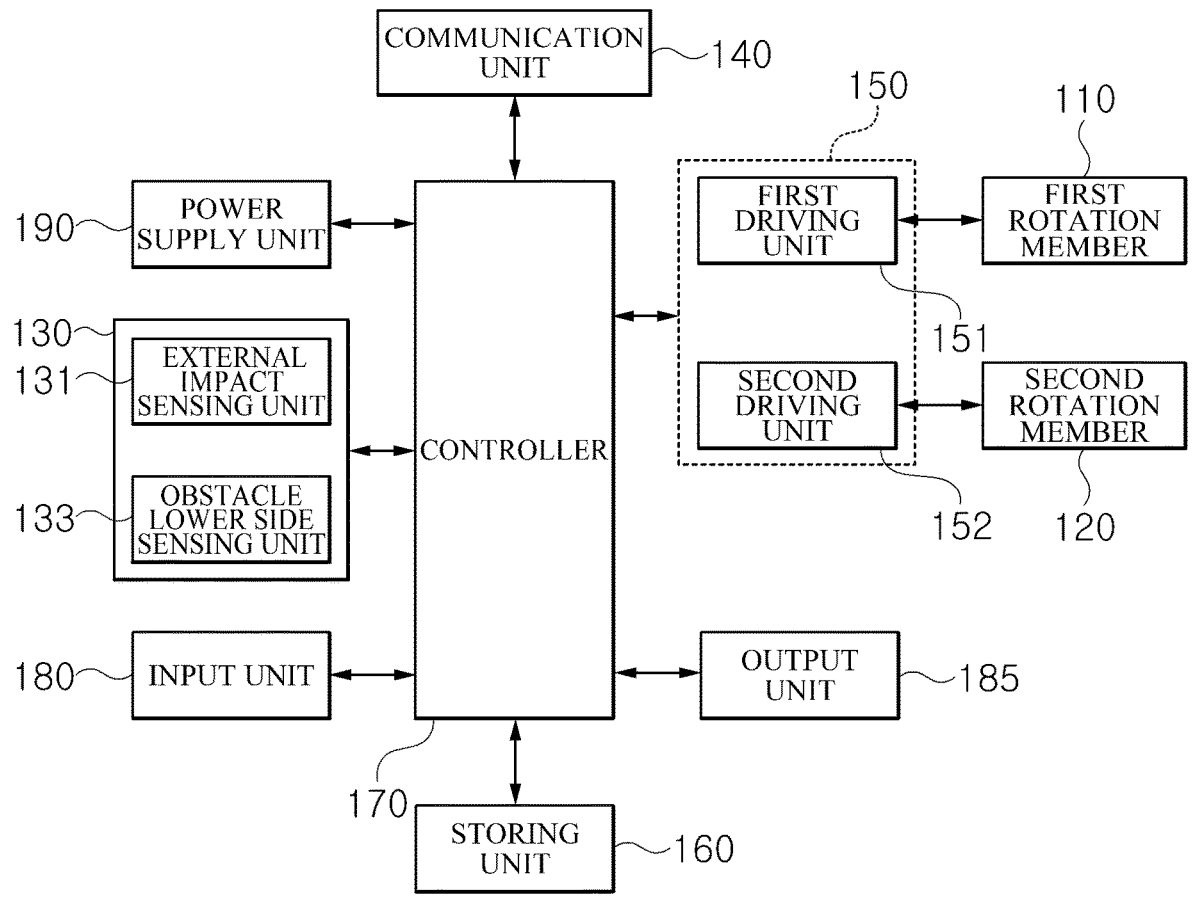
FIG. 5 is a block diagram of a robot cleaner according to various exemplary embodiments of the present invention.
FIGS. 6 and 7 are views illustrating a traveling operation of a robot cleaner according to various exemplary embodiments of the present invention.

FIG. 5 is a block diagram of a robot cleaner according to an exemplary embodiment of the present invention. Referring to FIG. 5, the robot cleaner according to an exemplary embodiment of the present invention includes a sensing unit 130, a communication unit 140, a driving unit 150 for driving first and second rotary members 110 and 120, a storage unit 160, a controller 170, an input unit 180, an output unit 185, and a power supply unit 190.

The sensing unit 130 may sense various types of information required for an operation of the robot cleaner 100 and transmit a sensing signal to the controller 170. Here, the sensing unit 130 may include at least one of an external impact sensing unit 131 and an obstacle lower side sensing unit 133.

As described above, the external impact sensing unit 131 may sense an external impact applied to the bumper 20 and transmit a sensing signal to the controller 170. The external impact sensing unit 131 may be implemented as a contact sensor, an optical sensor, and the like.

The obstacle lower side sensing unit 133 may sense whether a traveling position of the robot cleaner 100 is below an obstacle, and transmit a sensing signal to the controller 170. In detail, in cases where an obstacle is positioned to float at a predetermined height such as a sofa, a bed, and the like, the robot cleaner 100 may travel below the obstacle through a space between a floor and the obstacle, and the obstacle lower side sensing unit 133 may sense whether the traveling position of the robot cleaner 100 is below the obstacle.

Here, the obstacle lower side sensing unit 133 may include at least one of an illumination sensor sensing whether a traveling position of the robot cleaner 100 is below the obstacle through ambient brightness and a distance sensor sensing whether a traveling position of the robot cleaner 100 is below the obstacle by sensing a distance to a lower surface of the obstacle.

When the obstacle lower side sensing unit 133 is implemented as an illumination sensor, the illumination sensor may continue to sense intensity of illumination of an upper side of the robot cleaner 100 and transmit a sensing signal to the controller 170. Here, the controller 170 may determine a traveling position of the robot cleaner 100 on the basis of the sensing signal from the obstacle lower side sensing unit 133. In detail, when intensity of illumination of an upper side of the robot cleaner 100 is rapidly reduced according to a result of checking the sensing signal, the controller 170 may determine that a traveling position of the robot cleaner 100 is below an obstacle. Here, the controller 170 may control the driving unit 150 to avoid the lower side of the obstacle (i.e., to avoid a position or an area below the obstacle).

Also, when the obstacle lower side sensing unit 133 is implemented as a distance sensor, the distance sensor may continue to sense a distance to a lower surface of an obstacle above the robot cleaner 100 and transmit a sensing signal to the controller 170. Here, the controller 170 may determine a traveling position of the robot cleaner 100 on the basis of the sensing signal from the obstacle lower side sensing unit 133. In detail, when a distance to the lower surface of the obstacle above the robot cleaner 100 is rapidly reduced according to a result of checking the sensing signal, the controller 170 may determine that a traveling position of the robot cleaner 100 is below an obstacle. Here, the controller 170 may control the driving unit 150 to avoid the lower side of the obstacle.

Also, when the obstacle lower side sensing unit 133 is implemented by the illumination sensor and the distance sensor, the obstacle lower side sensing unit 133 may accurately determine whether a traveling position of the robot cleaner 100 is below an obstacle using both the two types of sensor. In detail, when intensity of illumination is reduced as the robot cleaner 100 approaches a lower side of the obstacle, the controller 170 may determine whether a traveling position of the robot cleaner 100 is below the obstacle using a distance calculated through the distance sensor.

Meanwhile, the communication unit 140 may include one or more modules enabling wireless communication between the robot cleaner 100 and another wireless terminal or between the robot cleaner 100 and a network in which another wireless terminal is positioned. For example, the communication unit 140 may communicate with a wireless terminal as a remote controller, for which the communication unit 140 may include a short-range communication module, a wireless Internet module, and the like.

The robot cleaner 100 may be controlled in an operational state, an operation method, and the like, by a control signal received by the communication unit 140. A terminal controlling the robot cleaner 100 may include, for example, a smartphone, a tablet PC, a personal computer, a remote controller, and the like, available for performing communication with the robot cleaner 100.

The driving unit 150 may supply power for rotating the first and second rotary members 110 and 120 under the control of the controller 170. Here, the driving unit 150 may include a first driving unit 151 and a second driving unit 152, and may be implemented by including a motor and/or a gear assembly.

Meanwhile, the storage unit 160 may store a program for an operation of the controller 170 and may temporarily store input/output data. The storage unit 160 may include at least one type of storage medium among a flash memory type, a hard disk type, a multimedia card micro-type, a card type memory (e.g., an SD or XD memory, etc.) a random access memory (RAM), a static RAM (SRAM), a read-only memory (ROM), a programmable ROM (PROM), an electrically erasable programmable ROM (EEPROM), a magnetic memory, a magnetic disk, and an optical disk.

The input unit 180 may receive a user input operating the robot cleaner 100. In particular, the input unit 180 may receive a user input selecting an operation mode of the robot cleaner 100.

Here, the input unit 180 may be configured as a key pad, a dome switch, a touch pad (static pressure/capacitance), a jog wheel, a jog switch, and the like.

The output unit 185 serves to generate an output related to a sense of sight, a sense of hearing, and the like. Although not shown, the output unit 185 may include a display unit, an audio output module, an alarm unit, and the like.

The display unit displays (outputs) information processed in the robot cleaner 100. For example, when the robot cleaner is performing cleaning, the display unit may display a user interface (UI) or a graphic user interface (GUI) displaying a cleaning time, a cleaning method, a cleaning region, and the like, related to a cleaning mode.

The power supply unit 190 supplies power to the robot cleaner 100. In detail, the power supply unit 190 may supply power to each functional unit forming the robot cleaner 100, and when remaining power capacity is insufficient, the power supply unit 190 may be charged upon receiving a charge current. Here, the power supply unit 190 may be implemented as a rechargeable battery.

The controller 170 generally controls a general operation of the robot cleaner 100. In detail, the controller 170 may control the driving unit 150 to rotate at least one of the first rotary member 110 and the second rotary member 120 to cause the robot cleaner 100 to travel in a specific moving direction.

For example, when the first and second rotary members 110 and 120 rotate at the same speed in the same direction, the robot cleaner 100 may rotate on the spot. The robot cleaner 100 may rotate on the spot according to a speed at which the first and second rotary members 110 and 120 rotate.

In detail, when the first and second rotary members 110 and 120 rotate at the same speed in the same direction, one end and the other end positioned opposite to each other with respect to the center of the main body 10 of the robot cleaner 100 move in mutually opposite directions with respect to the target cleaning surface. That is, a direction in which one end positioned on the opposite side of the first rotary member 110 of the robot cleaner 100 moves on the target cleaning surface according to rotation of the first rotary member 110 and a direction in which the other end positioned on the opposite side of the second rotary member 120 of the robot cleaner 100 moves on the target cleaning surface according to rotation of the second rotary member 120 are opposite to each other.

Accordingly, resultant forces of frictional forces may act on the robot cleaner 100 in mutually opposite directions, acting as a rotational force of the robot cleaner 100.

In another example, the controller 170 may control the first and second rotary members 110 and 120 to rotate at the same speed in mutually different directions. Here, a direction in which one end moves on target cleaning surface by a frictional force of the first rotary member 110 with respect to the main body 10 of the robot cleaner 100 may be the same as a direction in which the other end moves on the target cleaning surface by a frictional force of the second rotary member 110.

Accordingly, the robot cleaner 100 may perform straight traveling in a specific direction. This will be described in detail with reference to FIGS. 6 and 7 hereinafter.

Figure 7:
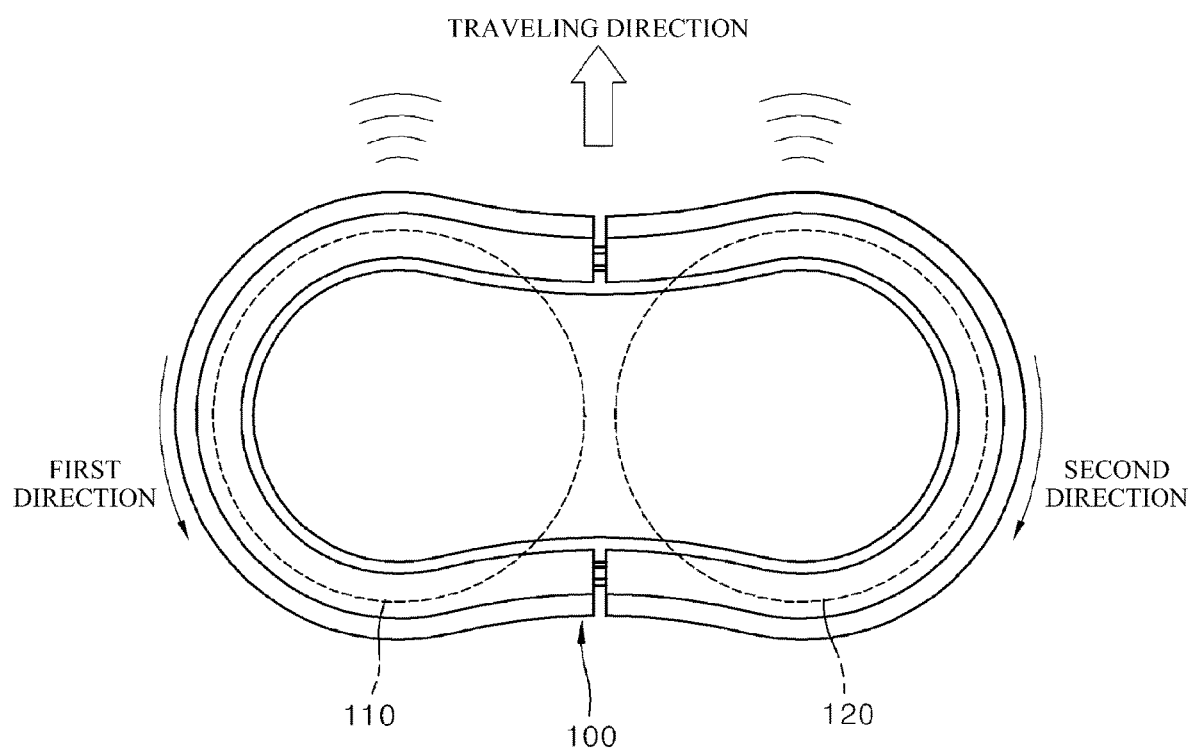

FIGS. 6 and 7 are views illustrating a traveling operation of a robot cleaner according to an exemplary embodiment of the present invention.

FIG. 6 illustrates a rotation control table for implementing straight traveling of a robot cleaner according to an exemplary embodiment of the present invention. The controller 170 may control rotation of each of the rotary members 110 and 120 by controlling the driving unit 150 on the basis of the rotation control table values stored in the storage unit 160. The rotation control table may include at least one of a direction value, a speed value, and a time value allocated to each of the rotary members 110 and 120 in each movement mode. As illustrated in FIG. 6, a rotation direction of the first rotary member 110 and a rotation direction of the second rotary member 120 may be different. Also, rotation speeds and time of the first and second rotation members 110 and 120 may be the same.

A rotation direction of the rotary members according to an exemplary embodiment of the present invention may be described on the basis of a direction in which the robot cleaner 100 is viewed from above. For example, a first direction may refer to a direction in which the robot cleaner 100 is rotated in a counterclockwise direction on the basis of a moving direction 300 as 12 o'clock in a state in which the robot cleaner 100 is viewed from above. Also, a second direction, different from the first direction, may refer to a direction in which the robot cleaner 100 is rotated in a clockwise direction on the basis of the moving direction 300 as 12 o'clock.

Here, the robot cleaner 100 may perform straight traveling as illustrated in FIG. 7. Referring to FIG. 7, the robot cleaner 100 according to an exemplary embodiment of the present invention may generate a relative movement power based on a frictional force and perform straight traveling in a traveling direction by rotating the first rotary member 110 in the first direction and rotating the second rotary member 120 in the second direction different to the first direction.

Meanwhile, a direction in which the rotational axes 310 and 320 are tilted in FIGS. 1 to 7 described above is merely illustrative and may be implemented to be tilted in any other direction according to an implementation example. For example, the first and second rotational axes 310 and 320 of the first and second rotary members 110 and 120, respectively, may be tilted at an angle opposite to the case of FIGS. 3 and 4, with respect to the central axis 300 corresponding to a longitudinal axis of the robot cleaner 100. Here, the first and second rotary members 110 and 120 may be upwardly tilted to an outer side with respect to the central axis 300. That is, among regions of the first and second rotary members 110 and 120, a region positioned to be closer to the central axis 300 may be more strongly adhered to the target cleaning surface than a region positioned to be away from the central axis 300. Here, when the pair of rotary members 110 and 120 rotate, a relative frictional force generated between the rotary members 110 and 120 and the target cleaning surface may be large at the center of the main body 10 than at an outer side thereof.

Thus, opposite to the case of FIGS. 1 to 7, a movement speed and a direction of the robot cleaner 100 may be controlled by controlling rotation of each of the pair of rotary members 110 and 120. In detail, the robot cleaner 100 may generate relative movement power based on a frictional force and perform straight traveling in a moving direction by rotating the first rotary member 110 in the second direction and rotating the second rotary member 120 in the first direction different to the second direction.

Meanwhile, when it is determined that a traveling position of the robot cleaner 100 is below an obstacle on the basis of a sensing signal from the obstacle lower side sensing unit 133, the controller 170 may control the driving unit 150 to avoid the lower side of the obstacle. Here, the controller 170 may control the driving unit 150 to avoid the lower side of the obstacle by controlling at least one of a rotation direction and a rotation speed of at least one of the first and second driving units 151 and 152. This will be described in detail with reference to FIGS. 8 to 12 hereinafter.

Figure 8:
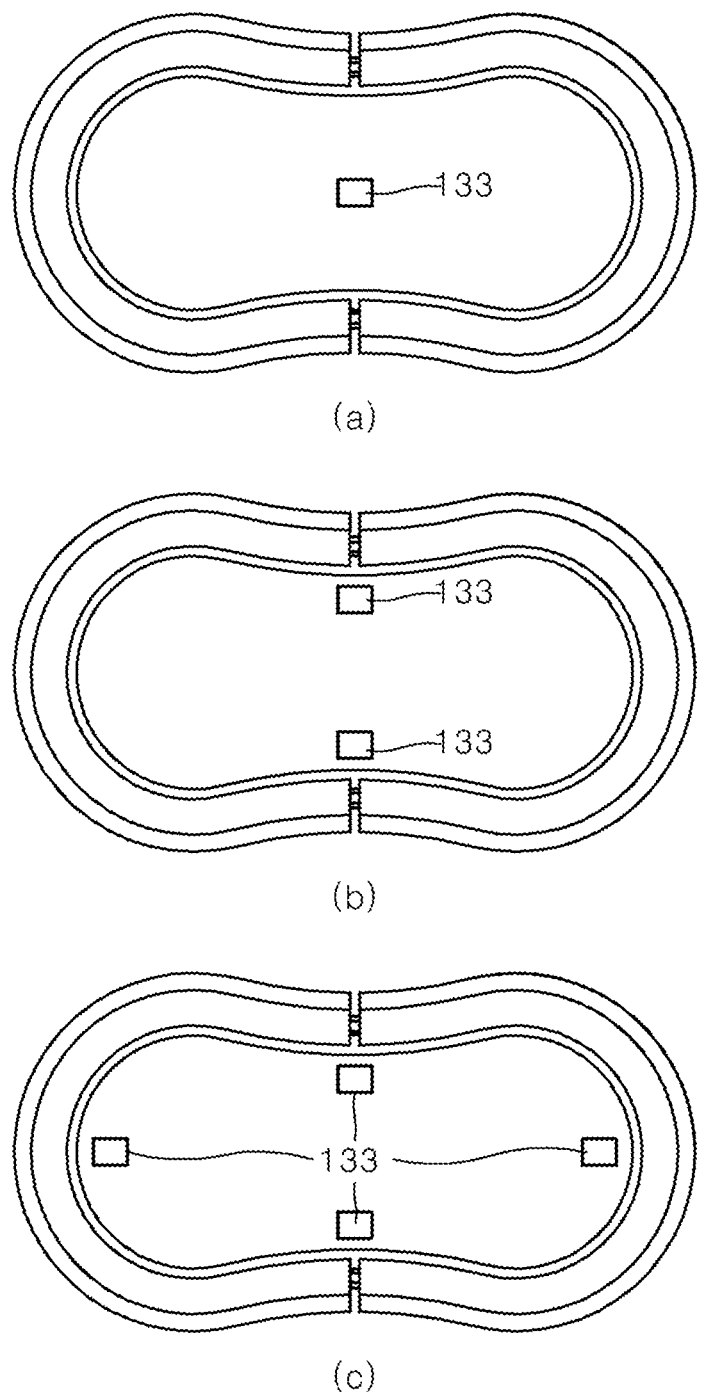
FIG. 8 is a view illustrating an obstacle lower side sensor according to various exemplary embodiments of the present invention.

FIG. 8 is a view illustrating an obstacle lower side sensor according to an exemplary embodiment of the present invention. Referring to FIG. 8, the obstacle lower side sensing unit 133 may be installed on an upper surface of the main body 10 of the robot cleaner 100. For example, as illustrated in FIG. 8A, the obstacle lower side sensing unit 133 may be installed at the center of the upper surface of the main body 10 of the robot cleaner 100.

However, the robot cleaner 100 according to an exemplary embodiment of the present disclosure has a structure in which a front side and a rear side thereof are symmetrical, and the front side may become the rear side, or conversely, the rear side may become the front side, according to setting of a reference direction. Also, the robot cleaner 100 has a structure in which a left side and a right side are symmetrical, and the left side may become the right side, or conversely, the right side may become the left side, according to setting of a reference direction. Thus, as illustrated in FIG. 8B, the obstacle lower side sensing unit 133 may be installed on the front side and the rear side of the upper surface of the main body 10 of the robot cleaner 100, or, as illustrated in FIG. 8C, the obstacle lower side sensing unit 133 may be installed on the front side, the rear side, and both flanks of the upper surface of the main body 10 of the robot cleaner 100, whereby a lower side of an obstacle may be accurately sensed and the robot cleaner 100 may stably perform traveling.

Figure 9:
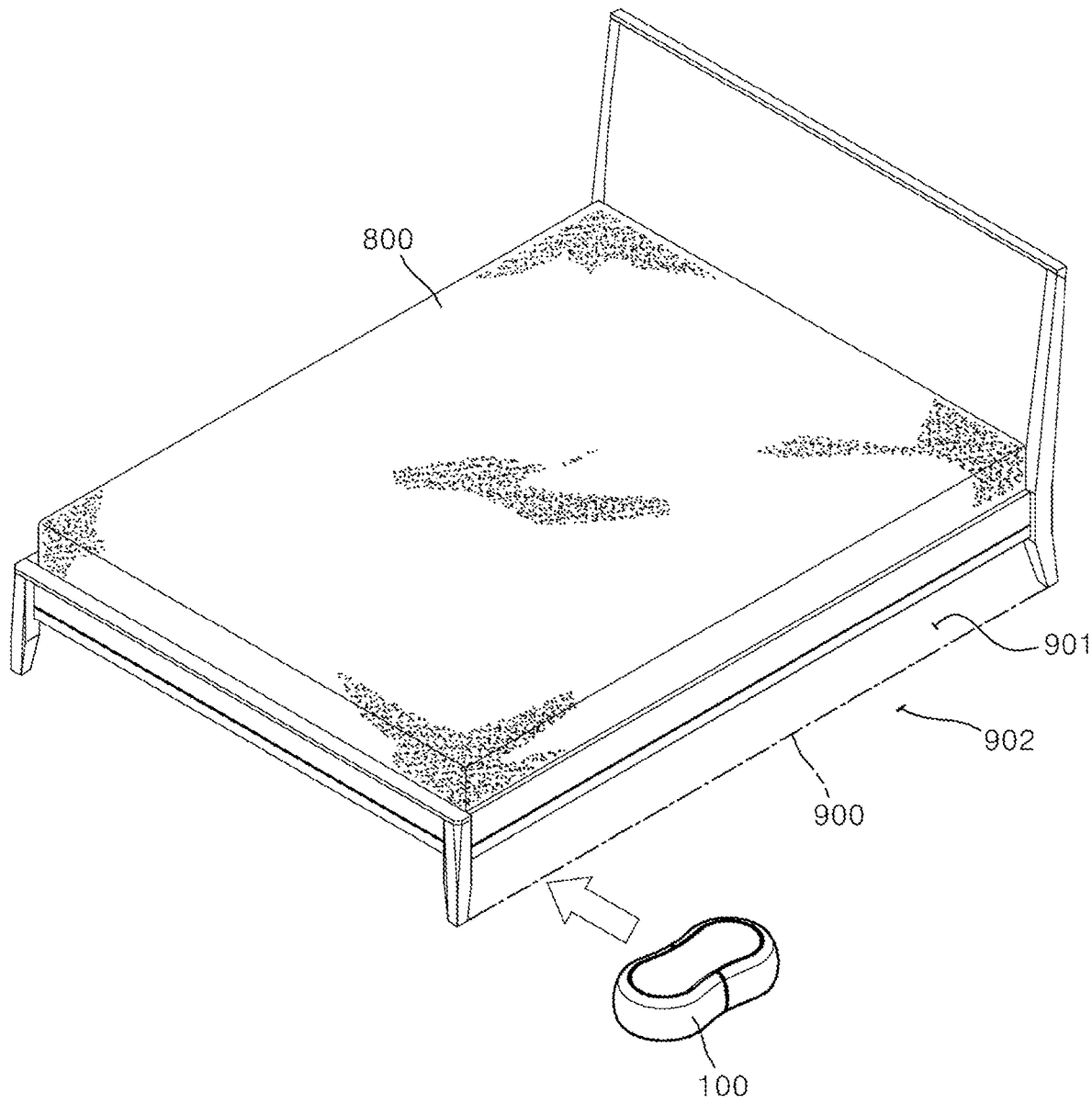
FIG. 9 is a view illustrating a traveling operation of a robot cleaner according to various exemplary embodiments of the present invention.

FIG. 9 is a view illustrating a traveling operation of a robot cleaner according to an exemplary embodiment of the present invention. Referring to FIG. 9, the robot cleaner 100 may travel using a frictional force between the first and second cleaners 210 and 220 generated according to rotation of the first and second rotary members 110 and 120 and a target cleaning surface, as a movement power source.

Also, various obstacles may be positioned on the target cleaning surface on which the robot cleaner 100 travels. For example, as illustrated in FIG. 9, an obstacle 800 floating at a predetermined height, such as a bed, or the like, may be positioned.

Here, as the robot cleaner 100 travels, the robot cleaner 100 may enter a lower side of the obstacle 800. However, unlike a general robot cleaner which travels using wheels and having a function of automatically returning to a charging station, the robot cleaner 100 according to an exemplary embodiment of the present invention is driven differently from the general robot cleaner, and thus, when the robot cleaner 100 travels below the obstacle 800, various problems may arise. For example, when a battery of the robot cleaner 100 is discharged below the obstacle 800, the user may need to search through a house to locate the robot cleaner 100. In another example, there is a high possibility that an electric line, garbage neglected for a long period of time, and the like, may be present below the obstacle 800, leading to a problem in which the robot cleaner 100 is caught by the electric line below the obstacle 800 and cannot travel. In addition, various other problems may arise.

Thus, when the controller 170 according to an exemplary embodiment of the present invention determines that a traveling position of the robot cleaner 100 is below an obstacle on the basis of a sensing signal from the obstacle lower side sensing unit 133, the controller 170 may control the driving unit 150 to avoid the lower side of the obstacle.

For example, in order to avoid the lower side of the obstacle, the controller 170 may control the driving unit 150 to cause the robot cleaner 100 to travel along a boundary region between a region below the obstacle and a region not below the obstacle. This will be described in detail with reference to FIGS. 10 and 11 hereinafter.

Figure 10:
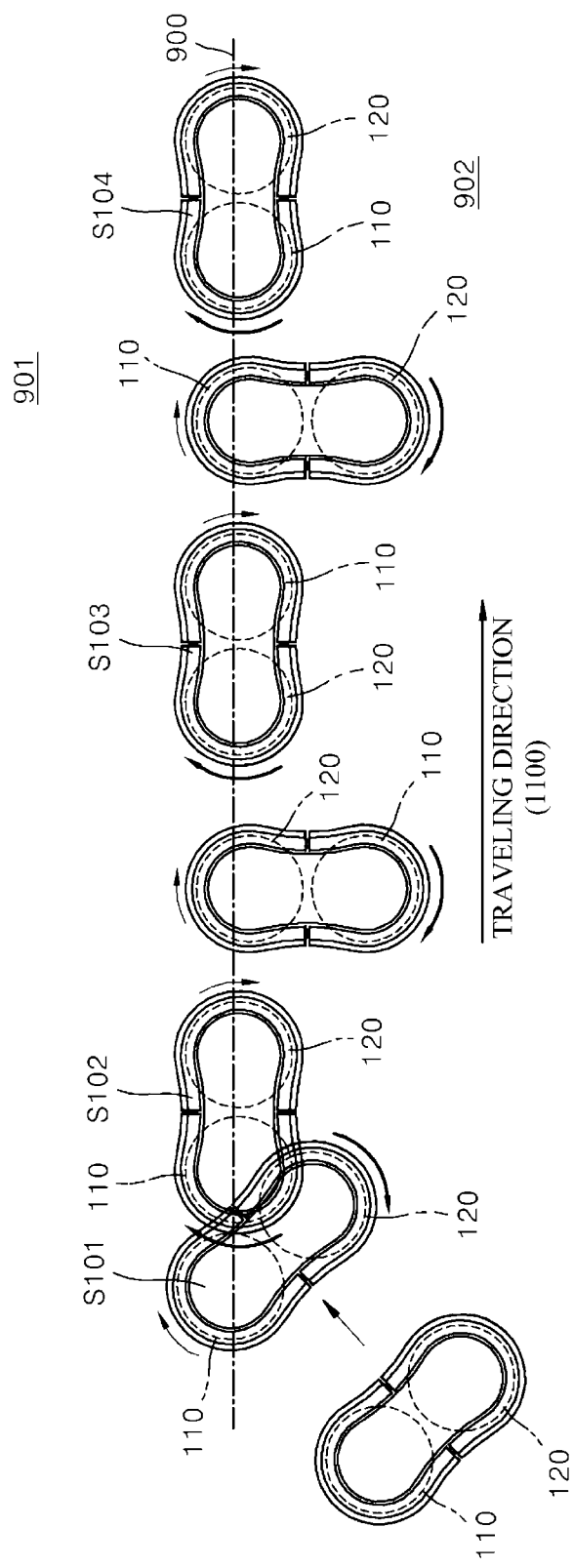
FIGS. 10 to 12 are views illustrating an obstacle lower side avoiding method of a robot cleaner according to various exemplary embodiments of the present invention.

Referring to FIG. 10, as the robot cleaner 100 rotationally travels, the controller 170 may control at least one of a rotation direction and a rotation speed of at least one of the first driving unit 151 and the second driving unit 152 such that the front side and the rear side of the robot cleaner 100 are sequentially disposed to be parallel to the boundary region and the robot cleaner 100 travels along the boundary region.

In detail, as the robot cleaner travels to perform cleaning, the robot cleaner 100 may be positioned below the obstacle 800 (S101). Here, the controller 170 may determine that the robot cleaner 100 is currently positioned below an obstacle on the basis of a sensing signal from the obstacle lower side sensing unit 133, and perform controlling to start a mode in which the robot cleaner 100 travels along a boundary mode 900 between a region 901 of the target cleaning surface below the obstacle and a region 902 of the target cleaning surface not below the obstacle.

When the mode in which the robot cleaner 100 travels along the boundary region 900 starts, the controller 170 may set the boundary region 900 on the basis of a sensing signal from the obstacle lower side sensing unit 133. For example, when the obstacle lower side sensing unit 133 is implemented as illustrated in FIG. 8B or 8C, the controller 170 may set the boundary region 900 on the basis of sensing signals from a plurality of obstacle lower side sensing units 133

Meanwhile, when the robot cleaner 100 travels along the boundary region 900, the controller 170 may continue to update the set boundary region 900 on the basis of an obstacle lower side sensing signal received through the obstacle lower side sensing unit 133.

Also, the controller 170 may determine a driving direction 1100 of the mode for the robot cleaner 100 to travel along the boundary region 900. Here, the traveling direction 1100 may be determined as any one of either directions parallel to the boundary region 900.

Also, the controller 170 may control at least one of a rotation direction and a rotation speed of at least one of the first and second driving units 151 and 152 to cause the front side of the robot cleaner 100 to be disposed to be parallel to the boundary region 900 (S102).

Also, the controller 170 may determine a rotation direction of the rotary members 110 and 120 of the robot cleaner 100 according to the traveling direction 1100. As illustrated in FIG. 10, a rotation direction of the first and second rotary members 110 and 120 for the robot cleaner 100 to travel in the traveling direction 1100 may be determined as a clockwise direction, i.e., the second direction.

Also, the controller 170 may selectively control the first rotary member 110 to rotate at a rate higher than that of the second rotary member 120 in the rotation direction to cause the robot cleaner 100 to rotationally travel such that the rear side thereof is disposed to be parallel to the boundary region 900 (S103).

Thereafter, the controller 170 may selectively control the second rotary member 120 to rotate at a rate higher than that of the first rotary member 110 to cause the robot cleaner 100 to rotationally travel such that the front side is disposed to be parallel to the boundary region 900 again.

In this manner, the robot cleaner 100 may perform wet cleaning, while traveling along the boundary region 900 by controlling the rotation direction and rotation speed of at least one of the first and second rotary members 110 and 120.

Figure 11:
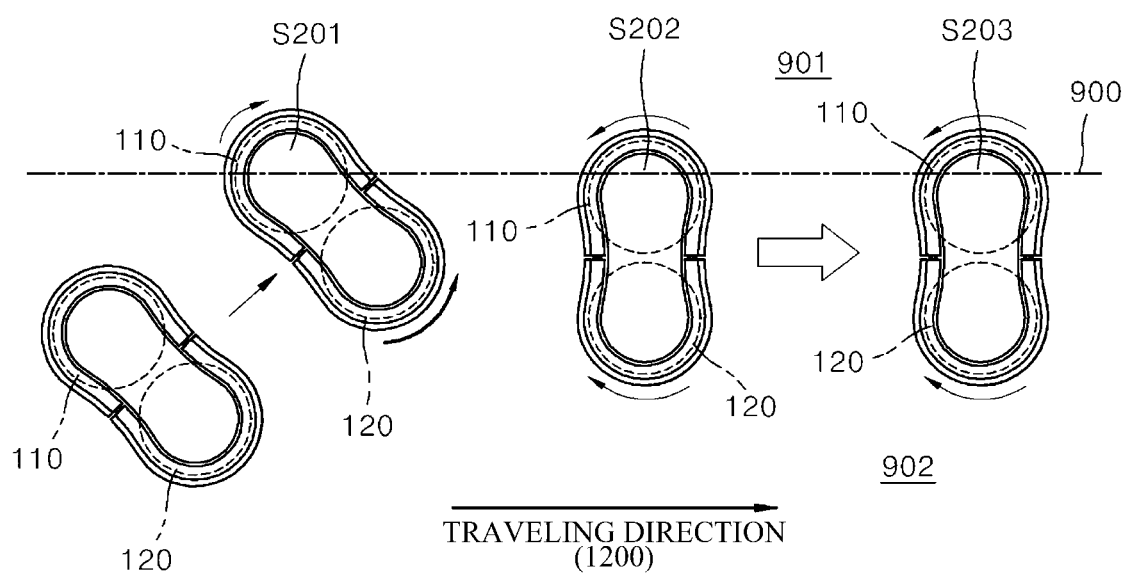

Referring to FIG. 11, the controller 170 may control at least one of the rotation direction and rotation speed of at least one of the first and second driving units 151 and 152 such that a flank of the robot cleaner 100 is disposed to be parallel to the boundary region 900 and performs straight traveling along the boundary region 900.

In detail, as the robot cleaner 100 travels to perform cleaning, the robot cleaner 100 may be positioned below the obstacle 800 (S201). Here, the controller 170 may determine that the robot cleaner 100 is currently positioned below the obstacle 800 on the basis of a sensing signal from the obstacle lower side sensing unit 133, and perform controlling to start a mode in which the robot cleaner 100 travels along the boundary region 900 between the region 901 of the target cleaning surface below the obstacle and the region 902 of the target cleaning surface not below the obstacle.

When the mode for the robot cleaner 100 to travel along the boundary region 900 starts, the controller 170 may set the boundary region 900 on the basis of a sensing signal from the obstacle lower side sensing unit 133. When the robot cleaner 100 travels along the boundary region 900, the controller 170 may continue to update the set boundary region 900 on the basis of an obstacle lower side sensing signal received through the obstacle lower side sensing unit 133.

Also, the controller 170 may determine a driving direction 1200 of the mode for the robot cleaner 100 to travel along the boundary region 900. Here, the traveling direction 1200 may be determined as any one of both directions parallel to the boundary region 900.

Also, the controller 170 may control at least one of a rotation direction and a rotation speed of at least one of the first and second driving units 151 and 152 to cause the flank of the robot cleaner 100 to be disposed to be parallel to the boundary region 900 (S202).

Also, the controller 170 may determine a rotation direction of the rotary members 110 and 120 of the robot cleaner 100 according to the traveling direction 1200. As illustrated in FIG. 11, the controller 170 may control the first rotary member 110 to rotate in the first direction and the second rotary member 120 to rotate in the second direction different to the first direction, causing the robot cleaner 100 to perform straight traveling in the traveling direction 1200 (S203).

Accordingly, the robot cleaner 100 may perform wet cleaning, while traveling along the boundary region 900.

Meanwhile, when the mode for the robot cleaner 100 to travel along the boundary mode 900 starts, the controller 170 may control the robot cleaner to travel along the boundary region 900 in a state in which a portion of the body 10 of the robot cleaner 100 is positioned below the obstacle 800 and another portion thereof is not positioned below the obstacle 800 as illustrated in FIGS. 10 and 11.

That is, a portion of the cleaner of the robot cleaner 100 may clean the region 901 of the target cleaning surface below the obstacle 800, and the other portion of the cleaner of the robot cleaner 100 may perform the region 902 of the target cleaning surface not below the obstacle 800. Accordingly, the robot cleaner 100 may perform wet cleaning on the partial region with collected dust below the obstacle, while avoiding the lower side of the obstacle.

Also, since a portion of the body 10 of the robot cleaner 100 traveling below the obstacle 800 is exposed, even when the battery of the robot cleaner 100 is discharged below the obstacle 800, the user may easily locate the robot cleaner 100 and a problem in which the robot cleaner 100 is caught by an electric line below the obstacle 800 and cannot travel may be solved.

Meanwhile, the aforementioned example is merely illustrative and the robot cleaner 100 according to another exemplary embodiment of the present disclosure may travel to perform cleaning in a state in which the entire body 10 is positioned in a region not below the obstacle.

Meanwhile, in another example, in order to avoid the obstacle, the controller 170 may control the robot cleaner 100 to travel in a direction opposite to the lower side of the obstacle by controlling at least one of a rotation direction and a rotation speed of at least one of the first and second driving units 151 and 152. Here, the direction opposite to the lower side of the obstacle may include any direction excluding the directions 1100 and 1200 in which the robot cleaner 100 travels along the boundary region, among every direction for avoiding the lower side of the obstacle. This will be described in detail with reference to FIG. 12.

Figure 12:
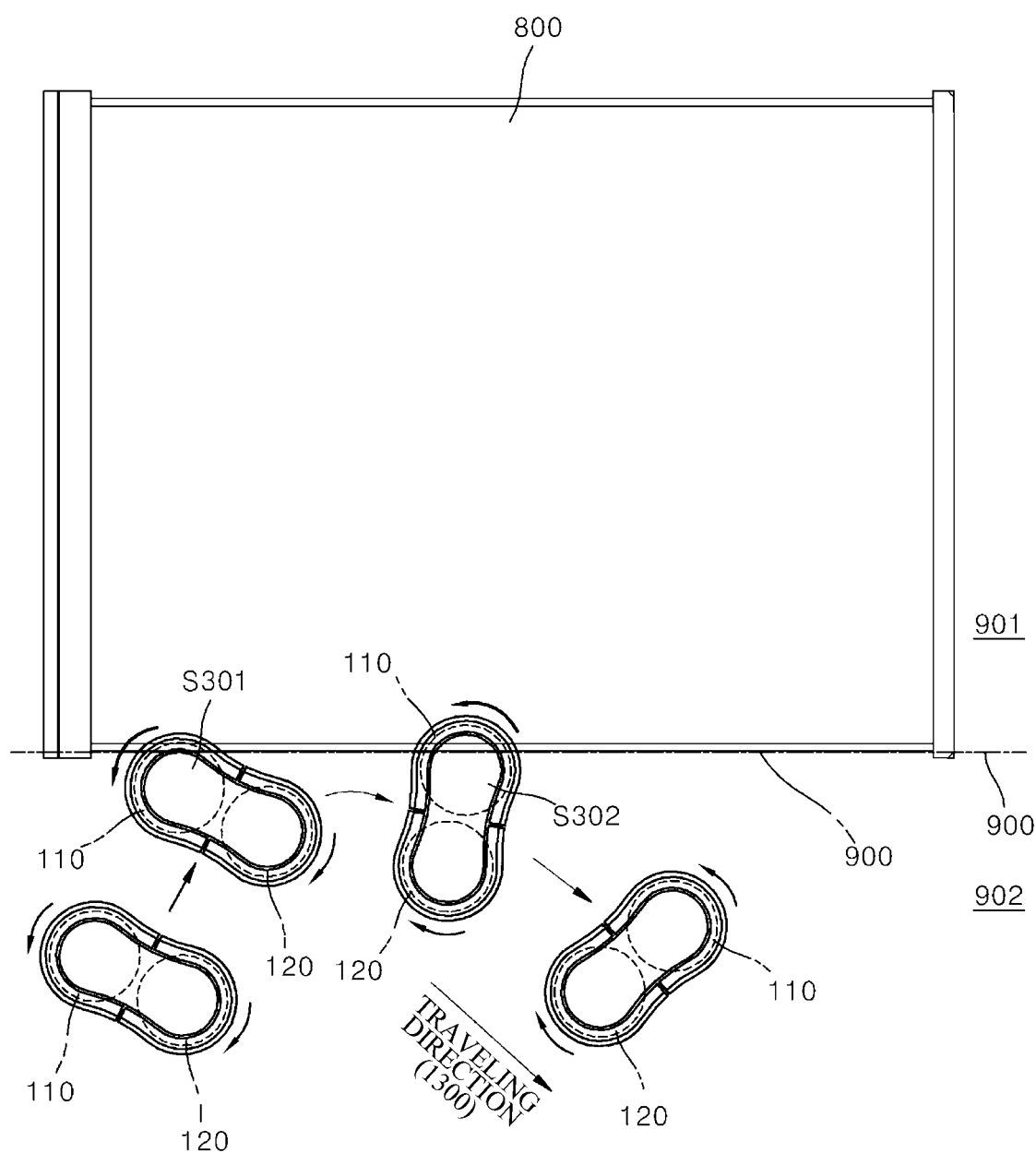

Referring to FIG. 12, as the robot cleaner 100 travels to perform cleaning, the robot cleaner 100 may be positioned below the obstacle 800 (S301). Here, the controller 170 may be determined that the robot cleaner 100 is currently positioned below an obstacle on the basis of a sensing signal from the obstacle lower side sensing unit 133, and perform controlling to start a mode in which the robot cleaner 100 travels in a direction opposite to the lower side of the obstacle 800.

When the mode for the robot cleaner 100 to travel in the direction opposite to the lower side of the obstacle 800 starts, the controller 170 may determine a traveling direction 1300 of the robot cleaner 100. Here, the traveling direction 1300 may be the direction opposite to the lower side of the obstacle 800.

Also, the controller 170 may control the robot cleaner 100 to travel in the traveling direction 1300 by controlling at least one of a rotation direction and a rotation speed of at least one of the first and second driving units 151 and 152 (S302).

Accordingly, the robot cleaner 100 may perform wet cleaning, while avoiding the lower side of the obstacle 800.

Figure 13:
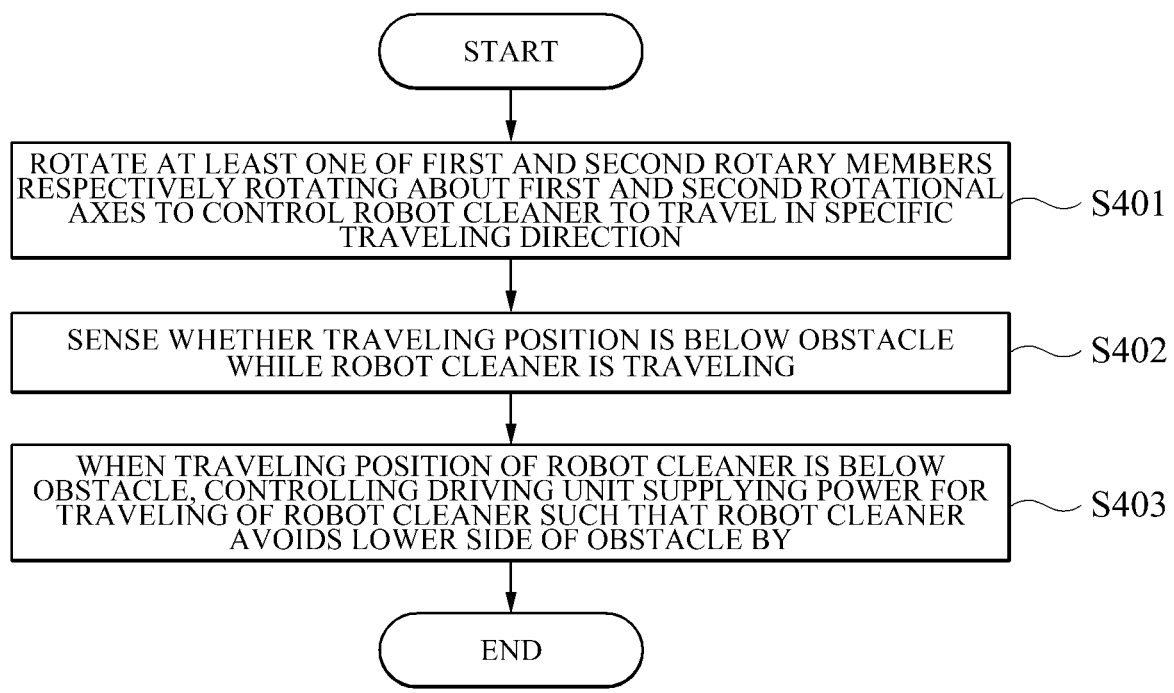
FIG. 13 is a flow chart illustrating a method for controlling a robot cleaner according to various exemplary embodiments of the present invention.

FIG. 13 is a flow chart illustrating a method for controlling a robot cleaner according to an exemplary embodiment of the present invention. Referring to FIG. 13, the robot cleaner 100 may be controlled to travel in a specific traveling direction by rotating at least one of the first and second rotary members 110 and 120 which respectively rotate about the first and second rotational axes 310 and 320 (S401).

Also, the robot cleaner 100, while traveling, may sense whether a traveling position thereof is below an obstacle (S402). Here, step S402 may be performed using at least one of an illumination sensor sensing whether the traveling position of the robot cleaner 100 is below an obstacle through ambient brightness and a distance sensor sensing whether the robot cleaner 100 is below an obstacle by sensing a distance to a lower surface of the obstacle.

Also, when it is determined that the traveling position of the robot cleaner 100 is below an obstacle, the robot cleaner 100 may be controlled to avoid a lower side of the obstacle by controlling the driving unit 150 supplying power for traveling of the robot cleaner 100 (S403). The driving unit 150 may include the first driving unit 151 corresponding to the first rotational axis 310 and the second driving unit 152 corresponding to the second rotational axis 320.

Here, in step S403 of controlling the robot cleaner 100 to avoid the lower side of the obstacle, the robot cleaner 100 may be controlled to travel along a boundary region between the region 901 below the obstacle and the region 902 not below the obstacle by controlling at least one of a rotation direction and a rotation speed of at least one of the first and second driving units 151 and 152.

Alternatively, in step S403 of controlling the robot cleaner 100 to avoid the lower side of the obstacle, the robot cleaner 100 may be controlled to travel in a direction opposite to the lower side of the obstacle by controlling at least one of the rotation direction and the rotation speed of at least one of the first and second driving units 151 and 152.

Meanwhile, the control method according to various exemplary embodiments of the present invention described above may be implemented by a program code and provided to each server or device, in a state of being stored in various non-transitory computer readable mediums.

The non-transitory computer readable medium is a medium that semi-permanently stores data therein and is readable by a device, rather than storing data for a short time such as a register, a cache, a memory, and the like. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments have been illustrated and described hereinabove, the present disclosure is not limited to the above-mentioned specific exemplary embodiments, but may be variously modified by those skilled in the art without departing from the scope and spirit of the present disclosure as disclosed in the accompanying claims. These modifications should also be understood to fall within the scope of the present disclosure.

The invention claimed is:

1. A robot cleaner comprising:
   a main body;
   a rechargeable battery for supplying electric power to the robot cleaner;
   a driving unit disposed in the main body and driving the robot cleaner;
   first and second rotary members respectively rotating about first and second rotational axes by the power supplied from the battery, wherein one or more cleaning tools for wet cleaning are detachably attached to the first and second rotary members;
   a sensing unit sensing whether the robot cleaner is located underneath an obstacle; and
   a controller controlling the driving unit, wherein when the controller determines that the robot cleaner is located underneath the obstacle based on a sensing signal received from the sensing unit, the controller controls the driving unit to drive the robot cleaner to move to escape from a lower side of the obstacle to prevent the battery from being discharged while being located underneath the obstacle,
   wherein each of the first and second rotational axes is tilted at a predetermined angle with respect to a central axis in a vertical direction of the robot cleaner, wherein each of the first and second rotary members is tilted with respect to the central axis such that a region of each of the first and second rotational members away from the central axis is configured to be more strongly adhered to a target cleaning surface than another region of each of the first and second rotational members closer to the central axis.

2. The robot cleaner of claim 1, wherein the sensing unit includes at least one of an illumination sensor for determining whether the robot cleaner is located underneath the obstacle by sensing ambient brightness and a distance sensor for determining whether the robot cleaner is located underneath the obstacle by sensing a distance to a lower surface of the obstacle.

3. The robot cleaner of claim 1, wherein the controller is further configured to check a residual value of the battery and to control the driving unit, if the controller predicts that the battery is to be discharged while the robot cleaner is located underneath the obstacle, and wherein the robot cleaner moves to escape from the lower side of the obstacle.

4. The robot cleaner of claim 1, wherein
   the driving unit includes a first driving unit for rotating the first rotary member about the first rotational axis and a second driving unit for rotating the second rotary member about the second rotational axis, and
   when the robot cleaner is located underneath the obstacle, the controller controls at least one of a rotation direction and a rotation speed of at least one of the first and second driving units, and the robot cleaner moves to escape from the lower side of the obstacle.

5. The robot cleaner of claim 4, wherein the controller controls at least one of the rotation direction and the rotation speed of at least one of the first and second driving units, the robot cleaner travels along a boundary region between a region underneath the obstacle and a region not underneath the obstacle.

6. The robot cleaner of claim 5, wherein the controller controls at least one of the rotation direction and the rotation speed of at least one of the first and second driving units, and a front side and a rear side of the robot cleaner are consecutively disposed to be parallel to the boundary region according to a traveling path of the robot cleaner along the boundary region.

7. The robot cleaner of claim 5, wherein the controller controls at least one of the rotation direction and the rotation speed of at least one of the first and second driving units, and a flank of the robot cleaner is disposed to be parallel to the boundary region to move straightly along the boundary region.

8. The robot cleaner of claim 4, wherein the controller controls at least one of the rotation direction and the rotation speed of at least one of the first and second driving units, and the robot cleaner travels in a direction opposite to the lower side of the obstacle.

9. The robot cleaner of claim 5, wherein the controller controls the robot cleaner to travel along the boundary region in a state in which a portion of the robot cleaner is positioned beneath the obstacle and another portion thereof is not positioned beneath the obstacle.

10. A method for controlling a robot cleaner, the method comprising:
   rotating at least one of first and second rotary members respectively about first and second rotational axes to control the robot cleaner to travel in a specific traveling direction;
   determining whether the robot cleaner is located beneath an obstacle while the robot cleaner is traveling; and
   when the robot cleaner is located beneath the obstacle and it is predicted that a rechargeable battery for supplying electric power to the robot cleaner will be discharged while being located underneath the obstacle, controlling a driving unit for driving the robot cleaner such that the robot cleaner moves to escape from a lower side of the obstacle.

11. The method of claim 10, further comprising checking a residual value of the battery,
wherein the controlling of the robot cleaner to move to escape from the lower side of the obstacle is performed only when it is predicted that the battery is to be discharged while the robot cleaner is located beneath the obstacle.

12. The method of claim 10, wherein
the driving unit includes a first driving unit for rotating the first rotary member about the first rotational axis and a second driving unit for rotating the second rotary member about the second rotational axis, and, when the robot cleaner is located underneath the obstacle, at least one of a rotation direction and a rotation speed of at least one of the first and second driving units is controlled such that the robot cleaner moves to escape from the lower side of the obstacle.

13. The method of claim 12, wherein
at least one of the rotation direction and the rotation speed of at least one of the first and second driving units is controlled such that the robot cleaner travels along a boundary region between a region underneath the obstacle and a region not underneath the obstacle.

14. The method of claim 13, wherein
the robot cleaner is controlled to travel along the boundary region in a state in which a portion of the robot cleaner is positioned underneath the obstacle and another portion thereof is not positioned underneath the obstacle.

* * * * *